(12) United States Patent
Weldemariam et al.

(10) Patent No.: US 11,468,783 B2
(45) Date of Patent: Oct. 11, 2022

(54) COMMUNICATION DEVICES

(71) Applicant: International Business Machines Corporation, Yorktown Heights, NY (US)

(72) Inventors: Komminist Weldemariam, Ottawa (CA); Abdigani Diriye, Nairobi (KE); Itzhack Goldberg, Hadera (IL); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 16/431,682

(22) Filed: Jun. 4, 2019

(65) Prior Publication Data

US 2020/0388186 A1    Dec. 10, 2020

(51) Int. Cl.
*G09B 19/00* (2006.01)
*G09B 5/00* (2006.01)
*H04M 1/72463* (2021.01)

(52) U.S. Cl.
CPC .............. *G09B 19/00* (2013.01); *G09B 5/00* (2013.01); *H04M 1/72463* (2021.01)

(58) Field of Classification Search
CPC ................................. H04M 1/72448
See application file for complete search history.

(56) References Cited

U.S. PATENT DOCUMENTS

| | | | |
|---|---|---|---|
| 9,921,726 B1 * | 3/2018 | Sculley | A47C 7/723 |
| 11,012,454 B1 * | 5/2021 | Han | H04L 63/1425 |
| 2005/0026121 A1 * | 2/2005 | Leonhard | G09B 5/00 434/238 |
| 2005/0181808 A1 | 8/2005 | Vaudreuil | |
| 2009/0197584 A1 * | 8/2009 | Snow | H04M 1/72463 455/418 |
| 2012/0244834 A1 | 9/2012 | Behairy et al. | |
| 2016/0092600 A1 * | 3/2016 | Chan | G06F 16/122 707/769 |
| 2016/0180737 A1 * | 6/2016 | Clark | G09B 5/02 434/236 |
| 2016/0274744 A1 * | 9/2016 | Neumann | H04N 21/252 |
| 2018/0004544 A1 * | 1/2018 | Vasiltschenko | H04L 67/26 |

(Continued)

FOREIGN PATENT DOCUMENTS

CN    1418036 A1    5/2003

OTHER PUBLICATIONS

Brian Murphy, USA Today article Israel's 'kosher' cellphone testing appetite for growth, posted Mar. 31, 2016, webpage http://usatoday30.usatoday.com/tech/products/2006-03-31-kosher-phone_x.htm, pp. 1-3.

(Continued)

*Primary Examiner* — Steve Rowland
(74) *Attorney, Agent, or Firm* — Shimon Benjamin; Otterstedt & Kammer PLLC

(57) ABSTRACT

Methods and systems for culturally sensitive operation of an electronic device. One or more cultural characteristics (CC) related to use of a communication device are determined and one or more cultural characteristics rules are learned. An amelioration action is triggered based on use of the communication device, the one or more cultural characteristics rules, and a confidence/risk level.

20 Claims, 10 Drawing Sheets

| | | |
|---|---|---|
| Sunday | Holiday A, Behavior Type B to be refrained from in Belief System C | |
| Monday | | Holiday G, Behavior Type D to be refrained from in Belief System H |
| Tuesday | | |
| Wednesday | | |
| Thursday | | |
| Friday | | |
| Saturday | | Holiday B, Behavior Type D to be refrained from in Belief System H |

(56) References Cited

U.S. PATENT DOCUMENTS

2018/0285767 A1* 10/2018 Chew .................... G06N 20/00
2019/0108362 A1* 4/2019 Miller .................. H04W 76/14
2019/0139438 A1* 5/2019 Tu ........................... G09B 5/02
2019/0272553 A1* 9/2019 Saini ..................... G06N 3/088

OTHER PUBLICATIONS

Ahmed, HaqIslam Using Mobile Phones web page Jun. 5, 2012, webpage: http://haqislam.org/using-mobile-phones/, pp. 1-8.
Andy Roberts, 10 Modern Luxuries the Amish actually Use, May 24, 2015, webpage http://listverse.com/2015/05/24/10-modern-luxuries-the-amish-actually-use/ pp. 1-18.
Amish Studies The Young Center, webpage https://groups.etown.edu/amishstudies/cultural-practices/technology/pp. 1-3, downloaded Nov. 25, 2018.
Niv Elis, Samsumg Debuts 'Kosher' Smartphone, The Jerusalem Post, webpage http://www.jpost.com/Business-and-Innovation/Tech/Samsung-debuts-kosher-smartphone-455668 pp. 1-2, downloaded Nov. 25, 2018.
Howard Rheingold, Look Who's Talking, webpage https://www.wired.com/1999/01/amish/ pp. 1-10, Jan. 1, 1999.
Discover Lancaster, The Pennsylvania Amish and Their Use of Technology, downloaded from http://www.discoverlancaster.com/towns-and-heritage/amish-country/amishandtechnology.asp6-5-2019, pp. 1-2, believed published on-line at least as early as Mar. 19, 2017.
Peter Mell and Timothy Grance, The NIST Definition of Cloud Computing, NIST Special Publication 800-145, Sep. 2011, cover, pp. i-iii and 1-3.

* cited by examiner

| | | |
|---|---|---|
| Sunday | Holiday A, Behavior Type B to be refrained from in Belief System C | |
| Monday | | Holiday G, Behavior Type D to be refrained from in Belief System H |
| Tuesday | | |
| Wednesday | | |
| Thursday | | |
| Friday | | |
| Saturday | | Holiday B, Behavior Type D to be refrained from in Belief System H |

*FIG. 4*

COMMUNICATION DEVICES

BACKGROUND

The present invention relates to the electrical, electronic and computer arts, and more specifically, to computer-aided analytics and the like.

Communication devices, such as telephones, are often used in a manner that conflicts with norms, rules, and generally acceptable behavior involving culture, beliefs or belief systems, values, preferences, and the like. The culturally sensitive use of communication devices, such as telephones, has benefits for people seeking to use modern devices in locations where such cultural and related practices are practiced. The knowledge and ability to operate a communication device in a culturally sensitive manner is beneficial to users of such devices.

SUMMARY

Principles of the invention provide techniques for culturally sensitive electronic device operation. In one aspect, an exemplary method includes the step of determining one or more cultural characteristics (CC) related to use of a communication device; learning one or more cultural characteristics rules; and triggering an amelioration action based on use of the communication device, the one or more cultural characteristics rules, and a confidence/risk level.

In one aspect, a non-transitory computer readable medium comprises computer executable instructions which when executed by a computer (broadly understood to include also, for example, a "smart" phone or other communication device with processing capability) cause the computer to perform a method comprising operations of: determining one or more cultural characteristics (CC) related to use of a communication device; learning one or more cultural characteristics rules; and triggering an amelioration action based on use of the communication device, the one or more cultural characteristics rules, and a confidence/risk level.

In one aspect, an apparatus comprises a memory; and at least one processor, coupled to said memory, and operative to perform operations comprising: determining one or more cultural characteristics (CC) related to use of a communication device; learning one or more cultural characteristics rules; and triggering an amelioration action based on use of the communication device, the one or more cultural characteristics rules, and a confidence/risk level.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

manage operations of a communication device in accordance with cultural and religious norms, rules, and practices;

override of cultural features in communication devices in emergency situations;

control of features of a primary communication device by a secondary communication device;

dynamically configuring/reconfiguring a communication device in accordance with cultural and religious norms, rules, and practices by learning the geolocation context, historic uses of the communication device, profile(s) of a user and/or cohort, and the like; and intelligently identifying and providing contextual educational modules to clarify culturally sensitive concepts and terms.

These and other features and advantages of the present invention will become apparent from the following detailed description of illustrative embodiments thereof, which is to be read in connection with the accompanying drawings.

BRIEF DESCRIPTION OF THE DRAWINGS

FIG. 4 illustrates an example electronic calendar with entries indicating determined cultural characteristics and settings for a communication device, in accordance with an example embodiment;

DETAILED DESCRIPTION

Figure 1:
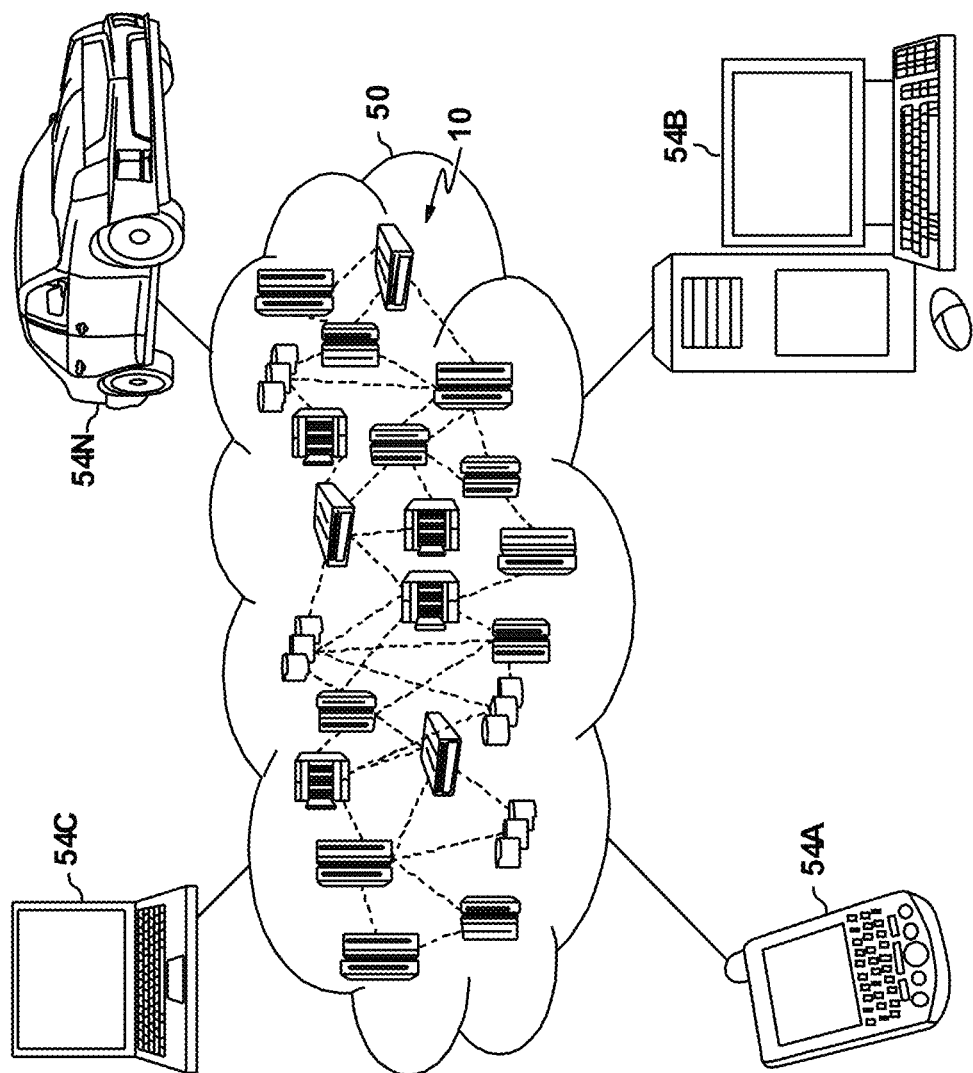
FIG. 1 depicts a cloud computing environment according to an embodiment of the present invention.

Generally, methods, apparatus, and systems for operating a communication device in a culturally sensitive manner are disclosed. As used herein, the terms culture and culturally sensitive includes aspects of culture, beliefs or belief systems, values, preferences, and the like. In one example embodiment, the system comprises a communication device (such as a cellular telephone) and a server or cloud-based service for determining cultural characteristics (CC) related to use of the communication device, accessing rules related to the cultural characteristic, and performing an amelioration action based on the use of the communication device, the rules, a confidence/risk level, or any combination thereof. In one example embodiment, which cultural features are enabled, when a cultural feature is enabled and/or disabled, or any combination thereof are specified by a user via, for example, an opt-in feature of the communication device. As used herein, the enablement of a cultural feature may entail disabling a feature or functionality of the communication device. For example, enabling a particular religious sensitivity feature disables a camera embedded in a smart phone during certain hours of a day.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
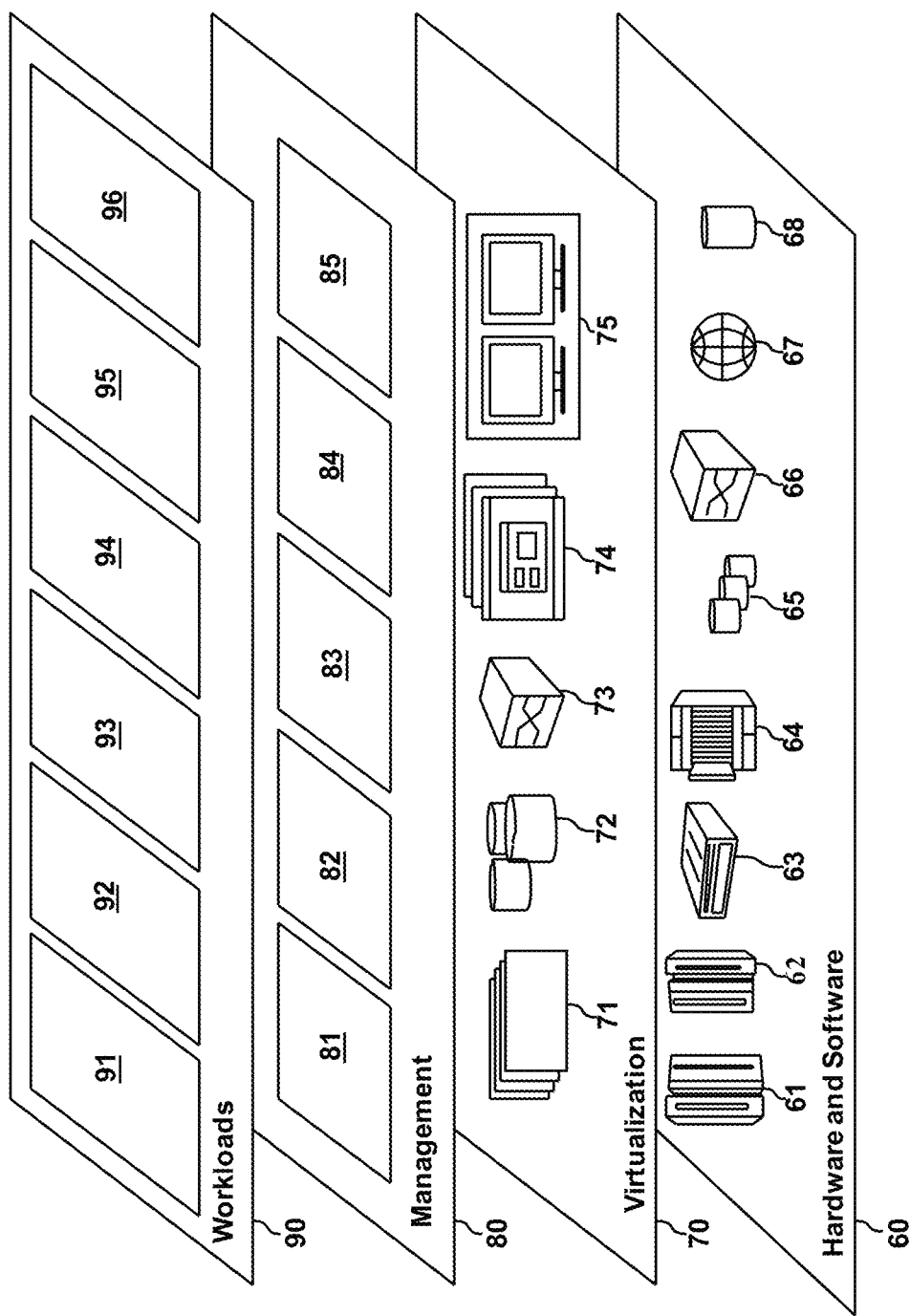
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cloud service for culturally sensitive telephone operation 96. It is to be understood that a variety of embodiments are possible, both cloud and non-cloud. For example, some embodiments will make use of a stand-alone application on a smart phone or the like.

Cultural Characteristics and Actions

In one example embodiment, rules, suggestions, guidance, beliefs, values, preferences, and the like (known as cultural characteristic rules herein) that are related to characteristics of culture and its related practices are considered in the operation of a communication device. The cultural characteristics relate, for example, to a time of day, a day of the week, a location of use, a purpose of use (such as business, personal, and emergency use), message content, common courtesy, preserving the family unit, personal rudeness, disruption concerns, overuse of communication device features (including teaching children about resisting such overuse), and the like. The cultural characteristic rules may relate to a current location and travel path of a user during a telephone call (such as avoiding certain neighborhoods, streets, or buildings at certain times or days of the week due to cultural practices in the area). In one example embodiment, the cultural characteristic rules are based on a contextualized cultural, norm-compliant analyzer module.

In one example embodiment, an amelioration action is, for example, providing an alert to a user, providing a brief education to the user, rewarding the user for favorable/acceptable/good use of the communication device, warning or discouraging a user regarding certain actions (such as accessing certain web sites or using certain ringtones), enabling, disabling, degrading or otherwise modifying a feature of the communication device, and the like.

Configuration and Reconfiguration

In one example embodiment, the communication device is configured or reconfigured based on cultural and religious norms, values, beliefs, preferences, rules, and the like. For example, a plug-and-play electronic calendar based on cultural context variations may be utilized. For example, an automated feed from an online (electronic) calendar is used to automatically set cultural characteristics and settings on the communication device. This may be done in advance of an actual day or holiday, or at the start of an actual day or holiday. The proposed culturally sensitive communication device may be preconfigured based on user defined specifications or rules, wherein such rules can be geotagged and/or can dynamically change based on learned context, historic uses of the communication device, user cohort/profile, and the like. In one example embodiment, a user is provided a graphical user interface to specify or select rules that can be compiled from a set of predefined rules or specifications. The usage, relevance, and effectiveness of the rules are tracked and learned according to specific geospatial context using machine learning models. The specific geospatial context can be inferred from a plurality of data sources by employing one or more machine learning models (such as social network analysis, information retrieval, and natural language processing). The plurality of data sources include social media websites, geolocation services provided by various open source tools and/or vendors (such as W3C Geolocation, Quova, Inc. of Mountain View, Calif., USA, MaxMind of Waltham, Mass., USA, and IP2Location of Penang, Malaysia), and the like. The one or more machine learning models monitor, learn, and profile geospatial context of a given location with respect to culturally sensitive features associated with use of a communication device. In one example embodiment, the profile of the geospatial context of all locations with respect to each culturally sensitive feature is stored in a geolocation database wherein each cultural feature and associated context is geotagged and represented in a knowledge graph model. The geospatial database also stores the user specified or learned rules which are used to preconfigure the proposed culturally sensitive communication device. The communication device may dynamically change preconfigured rules according to learned context, historic uses of the communication device, user/cohort profile, and the like.

In one example embodiment, the culturally sensitive communication device allows users to identify the culture such as, for example, a certain belief system, a school of thought, and the like. The selection may be made by a user via a graphical user interface (GUI). This may be performed in a privacy mode and anonymized as necessary. For example, one or more aspects of the selection process may not be communicated without some form of encryption or obfuscation.

The detection and identification of the purpose and/or content of a communication, such as a telephone call, may be indicated by a user pressing an emergency button, typing in a code, speaking an identifier (and performing natural language processing), and the like. This may be done in an opt-in fashion so as to reduce privacy concerns.

Educational Features

In one example embodiment, certain educational icons and information may be displayed on a user interface of the communication device. A contextual educational module may be triggered to provide personalized and interactive educational content to clarify culturally sensitive concepts and terms; the content can be optionally fetched from various information sources, such as databases, websites, and the like. The interactivity is provided, for example, by voice command, touch screen, immersive virtual reality or augmented reality, and the like.

Learning Educational Material

In one example embodiment, a custom natural language processing (NLP) module is used to extract cultural concepts and terms from cultural books (such as online religious books, ethical books regarding veganism, books on manners, books on preserving the family unit, and the like), scholarly articles, and the like. A knowledge graph may also be created based on the extracted cultural concepts and terms. A social networking system and cohort or profile from the user communication device may be used to personalize the delivery of the conceptual education and clarification. In one example embodiment, an analogy or metaphor translator is used to clarify the concept and terms based on the user profile (such as an illiterate user, a visually impaired user, and the like).

Indicating Cultural Sensitivities

In one example embodiment, the communication device provides indicators of cultural sensitivity. Such indicators may always be displayed on the communication device, may be displayed when the communication device is in use or is about to be used (such as placed in a user's hand), and the like. In one example embodiment, the indicators are linked to ringtones. The ringtones for specific cultural compatibility and geolocation context can be predefined, specified by the user, or learned over time from past usages. The <indicator, ringtone> pair can be stored in the rules database. For example, the user can specify one of the most common religious songs in his community as an indicator of cultural sensitivity or insensitivity. In one embodiment, the system may learn from crowd-sourced data using crowd analytics or crowd-density about who is using a phone around the user to determine a specific ringtone. Note that a count-time counter, hourglass, or icon may be displayed, educating the user as to the time in the future when it will be permissible to use the communication device or use certain features of the communication device. This is based, for example, on a time of the day, certain holidays, and the like; estimations of rudeness and disruptions to the family unit or other social or cultural settings, concerns, or instances where use of such devices is frowned upon by others; and the like. This may be akin to a "time remaining" indicator or an indication of "how much time must be waited" before a communication device feature (such as a texting capability, a camera, internet browsing, and the like) may be used. This feature may also be useful for parents teaching children about "will power" and more measured use of device features at home, during dinner time, and the like.

In one example embodiment, a secondary computing device may be used to control a first communication device and/or the secondary device may display certain cultural indicators regarding use of the first communication device. For example, a report of a culturally inappropriate use of the first communication device or the countdown timer, as described in the above paragraph, may be displayed on the secondary communication device; such that, for example, a parent can monitor the use of the first communication device by a child.

Predicting Non-Compliance

In one example embodiment, sequences and patterns are learned using a machine learning algorithm (such as decision trees, Naive Bayes classifier, logistic regression, boosting and AdaBoost, and the like) from past uses of the communication device and/or events to determine or predict that the "next use" of the communication device is related to either non-cultural, norm-compliant (such as, for example, insensitivity to certain traditions or practices of certain belief systems) or cultural, norm-compliant usage with a certain confidence level. The confidence level can be the probability that the "next use" of the phone falls into one of the compliant categories or classes (or the probability of input to fall in different classes). If a class has a high probability, then it will have a high confidence level. Moreover, the confidence value can be computed for single signal or events as well giving the meaning as to how confident the machine learning algorithm is for that class. The method of predicting the "next use" further includes using various data sources, such as data from the various sensors of the communication device (such as GPS, a gyroscope, an accelerometer, a camera sensor, an audio sensor, an ambient temperature sensor, a gravity sensor, a light sensor, a linear acceleration sensor, a proximity sensor, and the like), data from mobile applications (such as social networking applications, Facebook, Twitter, messaging apps (such as WHATSAPP®, WECHAT®, and SMS®), data from nearby computing/communication devices (such as cellular, Wi-Fi, and BLUETOOTH®), and the like. In one example embodiment, at least one machine learning algorithm (such as decision trees, Naive Bayes classifier, logistic regression, boosting and AdaBoost, and the like) is trained by analyzing and aggregating the data to determine the "next use" of the phone and context associated to the predicted "next use."

In one example embodiment, the method of determining or predicting the "next use" analyzes user call records/logs (using NLP, a voice recognition algorithm, and the like) and correlates them with a database of cultural characteristics. Conventional user activity prediction and/or recognition techniques from smartphone sensors and applications may also be used.

In one example embodiment, the contextualized, cultural norm-compliant analyzer module uses various data from one or more databases and machine learning models. An example of such a database is a "prohibited" (or discouraged) list of transactions database with risk levels and other contextual factors such as the location, the transacting parties, the type of transaction, and the like. If desired, phone usage may be controlled with respect to phone calls, text messaging, Internet actions, Bluetooth, memory card usage, video options, camera options, and the like. Consider the following example: a hypoglycemic event occurs: a glucose level of 60 mg/dl is measured by and obtained from a glucose meter. Constraints include a carb constraint (user does not like potatoes), a protein constraint (no pork allowed), a vegetable constraint (user prefers broccoli and carrots), and there are no fat constraints. A goal is a weight loss of about six pounds (about three kilograms) over the next three months. Since it is a hypoglycemic event, the system goal is to come up with a prohibited list that can eliminate food items that would raise the glucose level.

In one example embodiment, the communication device has information regarding its location and optionally information about other people (such as people with similarly culturally sensitive communication devices) in the vicinity of the communication device. Such individuals may be more sensitive to culturally insensitive phone use than those without such phones. Consider, for example, that there are N culturally sensitive phones (where N is greater than zero) within a 25-foot radius of a user. Thus, the risk of being insensitive in a social context may be increased in such cases, and the user's phone may thus take actions to decrease the use of culturally sensitive aspects of the user's phone, including the nature of ringtones, browsing the Web, texting, and the like. Note that knowledge about nearby culturally sensitive phones may be acquired only if the nearby users allow this or opt-in for this feature, thus preserving privacy.

The communication device also takes proactive steps to alert the user if the user's current context (such as time, location, other nearby communication devices, web sites, and the like) is similar to other contexts that result in or have resulted in violation of cultural norms in the past. This would be compared to incidents where the user has personally violated a cultural norm or others have violated a cultural norm. The user can also set goals for the cultural behavior that she or he wishes to adopt from individuals in her or his network/cohort and specific cultural behaviors he or she wishes to adopt (such as observing a day of rest required by a certain belief system, veganism, and the like), and can receive advice on actions to take to meet the goals.

Ameliorating Actions

In one example embodiment, the communication device is configured to trigger or perform one or more amelioration actions in response to detecting culturally insensitive usage of the communication device. The amelioration action can be, for example, alerting a family member of the usage based on the current user profile. For example, culturally insensitive usage of the communication device by an underage user can be detected and the system can send an amelioration alert to a secondary user device (such as to a computing device of a family member of the user where the identity of the family member is specified or preconfigured, identified via a phone log or phone book, and the like). In one example embodiment, the secondary computing device may be configured (such as via a specific GUI) to control the communication device based on the concern or risk level related, in context, to the cultural norm compliance and regulations.

In one example embodiment, the degree of compliance and strictness is set by a user. The degree of compliance and strictness may be set or "dialed" via a GUI of the communication device or another device. The degree may be set by the user of the communication device, the organization providing information or giving the communication device to the user, and the like.

In one example embodiment, the confidence/risk level may have multiple dimensions, including degree of risk and confidence, type of risk for a particular context and user, and the like. The multidimensional confidence/risk level may be used to trigger the sending of an alert to one or more secondary communication devices for each of the generated amelioration action.

In one example embodiment, the user interface of the communication device may be disabled (such as turned off) or degraded in response to, for example, cultural practices and observances, such as on certain days or holidays. Operating a communication device, such as a telephone, may involve separate cultural prohibitions at each stage of the operation. For example, removing a telephone from the receiver to produce a dial tone closes a circuit and makes a noise, which may come across as insensitive in certain cultures where such usage may conflict with customs and traditions Similarly, noises created by the act of dialing or the appearance of numerals on cell phone screens may be considered, in certain instances and in some cultures, as insensitive or even disrespectful.

Emergency Features

Notwithstanding, during emergency situations, certain capabilities and features of a communication device can be enabled and/or functional restrictions can be relaxed in an emergency. Accordingly, in one example embodiment, when placed in emergency mode, one or more features for cultural compliance are disabled, overridden, or both. In one example embodiment, the communication device triggers a signal to be sent to a cultural advisor. The communication device educates the user about a feature that is about to be used and describes why it may be discouraged or risky from a cultural standpoint.

In one example embodiment, when the communication device is in a special mode, a device feature, such as a phone camera, is disabled during certain times of day, in a certain location, and the like so as to be compliant with the cultural norms. The feature may be important, however, to retain or enable for emergency use. In emergency situations, therefore, the communication device may be put in an emergency mode and the feature, such as a camera, is enabled for emergency use. Similarly, a selective text messaging disabling function may prevent a person from text messaging during certain holy days or times of the week. When the cell phone user indicates an emergency situation, such as by dialing 911, the cell phone resumes its texting and camera functionality.

Self-Correction and Behavioral Tracking GUIs

In one example embodiment, the communication device is able to track, monitor, and store a log of a user's behavior. The communication device also prompts recommended ameliorating actions related to the user's behavior and provides feedback to the user on a dashboard to illustrate how compliant the user has been with the culture as well as a description of the times and locations when they were not adherent. The kinds of behaviors, self-correcting steps, and ways of avoiding contexts that would result in the user becoming non-compliant are also displayed on a GUI. For example, the communication device is able to monitor location and transaction data, and determine that a violation of the cultural constraints took place at time t and in locations x and y.

Rewards

Certain welcome behaviors may lead to harmony within families, cultures, and ethical belief systems. In one example embodiment, "rewards," guidance, suggestions, and the like are offered for good or useful behavior. Many inputs to the communication device may be performed in a privacy performing manner and anonymized. For example, one or more aspects of the inputs may not leave the communication device without some form of encryption or obfuscation.

Figure 3:
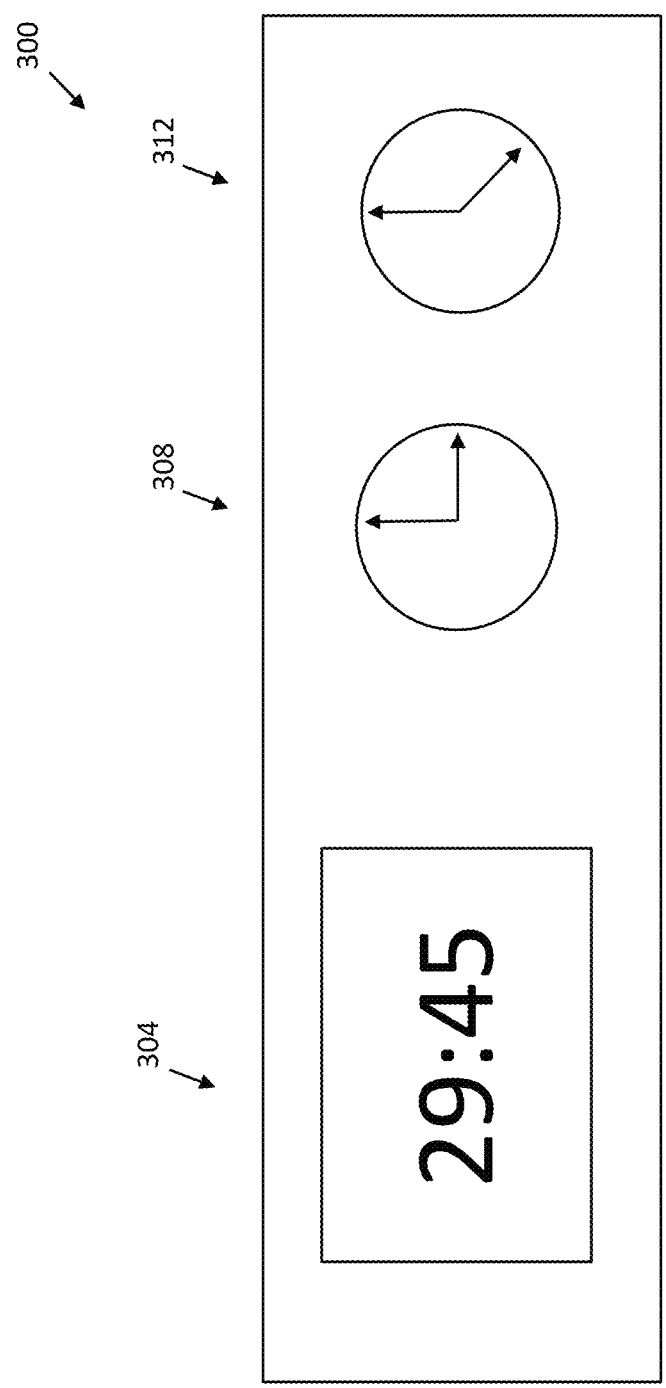
FIG. 3 illustrates an example dashboard for indicating when in the future it will be permissible to use specified features of the communication device, in accordance with an example embodiment.

In one example embodiment, an icon is displayed indicating when in the future it will be permissible to use specified features of the communication device. This is based, for example, on a time of the day, special occasions, holidays, and the like; estimations of rudeness and disruptions to the family unit or other social or cultural (e.g., religious) settings, concerns, or cultural practices; and the like. FIG. 3 illustrates an example dashboard 300 for indicating when in the future it will be permissible to use specified features of the communication device, in accordance with an example embodiment. The dashboard displays a countdown timer 304 and two clocks 308, 312 showing the start time and end time, respectively, for the period when the cultural features are enabled. As noted above, an enablement of a cultural feature can disable a feature or functionality of the communication device.

FIG. 4 illustrates an example electronic calendar with entries indicating determined cultural characteristics and settings for a communication device, in accordance with an example embodiment. In one example embodiment, the electronic calendar of a user may be populated in advance of the actual day or holiday. The method of disabling one or more features or functionalities of the communication device can be based on the populated calendar entries. In the example shown in FIG. 4, Belief System C has Holiday A on Sunday such that Behavior Type B should be refrained from; while Belief System H has Holiday G on Monday and Holiday B on Saturday such that Behavior Type D should be refrained from in each instance.

Figure 5:
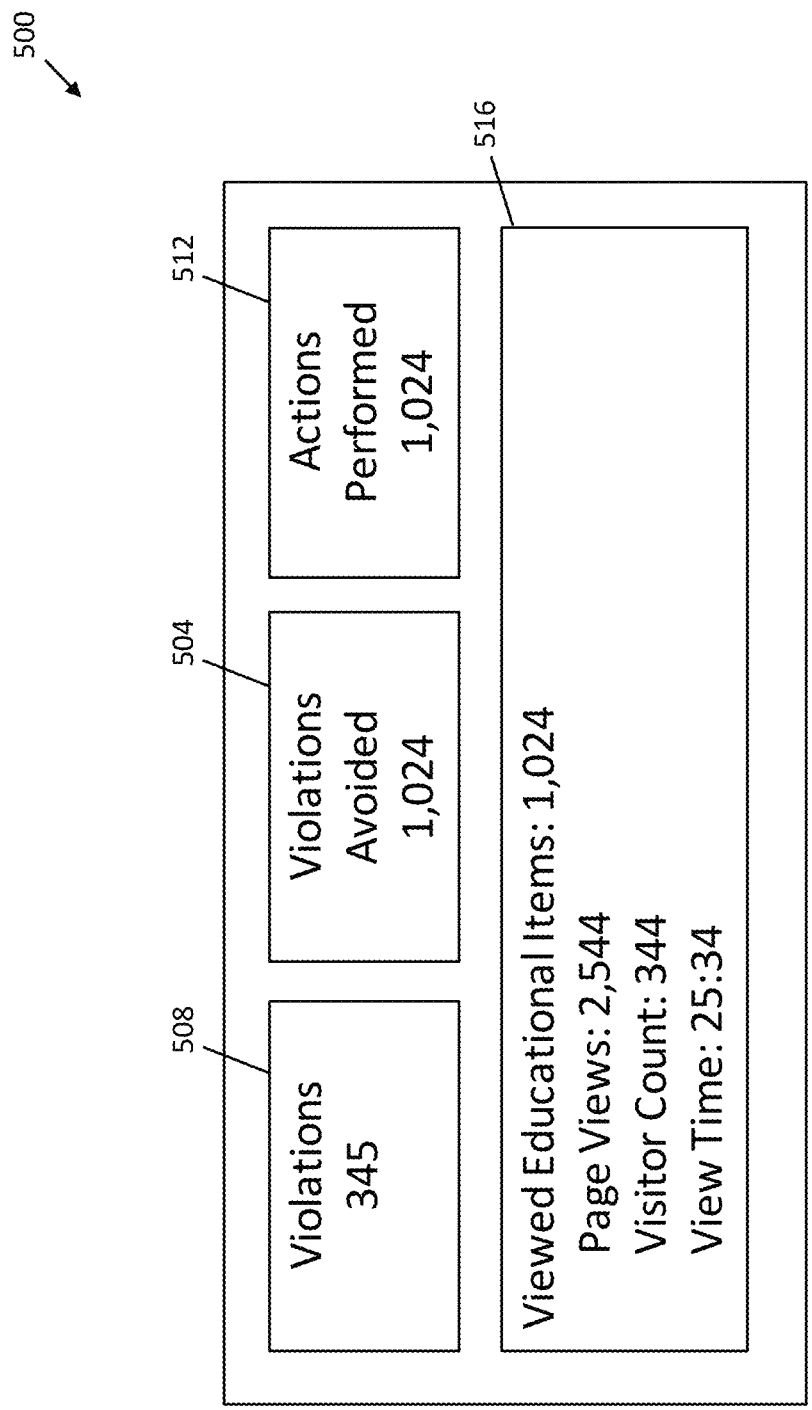
FIG. 5 illustrates a dashboard for visualizing user compliance with cultural norms, in accordance with an example embodiment.

FIG. 5 illustrates a dashboard 500 to show the visualization of compliance with cultural norms, in accordance with an example embodiment. The dashboard may also show how the user is performing compared to similar individuals and cohorts, and what steps need to be taken to achieve the user's cultural compliance goals. Various user privacy preserving techniques (including implementing zero-knowledge proof, storing and managing events or activities of a user's phone usage on blockchain technology) may be used. Display 504 illustrates the number of non-compliant incidents have been avoided through use of the disclosed techniques. Display 508 illustrates the number of violations that have been discovered. Optionally, a graph could be included to show the frequency of violations over time period x (omitted to avoid clutter). Display 512 indicates the number of mitigations or actions that have been taken, such as notifications, provisioning of educational videos, and the like. Display 516 indicates the number of educational items that have been viewed. This is content, for example, explaining what is culturally compliant and correct, and what is not. Display 516 also indicates a breakdown of the educational material that has been viewed, such as the number of page views, count of visitors, and viewing time.

Figure 6A:
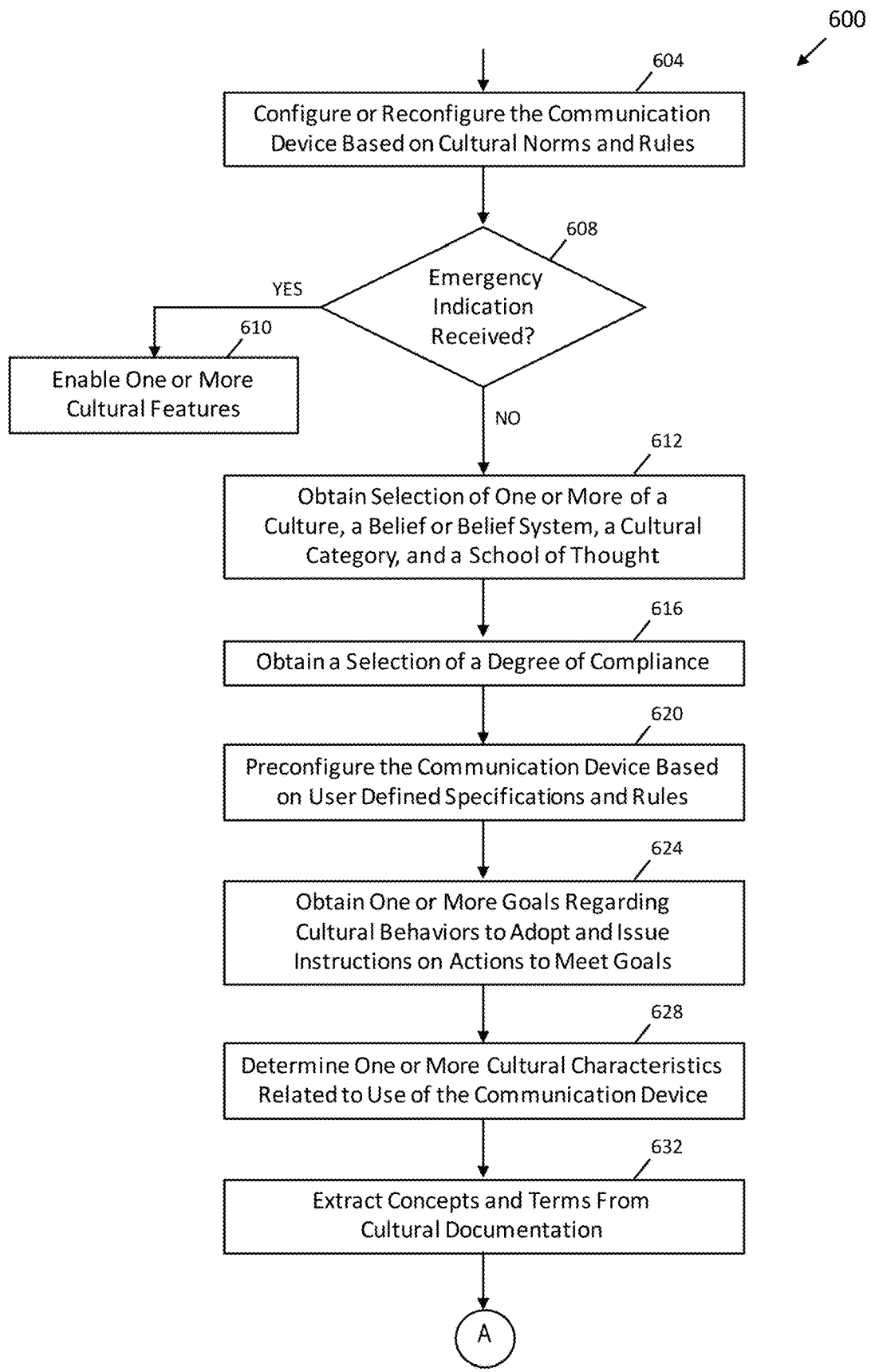
FIGS. 6A, 6B, and 6C are a flow chart of an example method for operating a communication device in a culturally sensitive manner, in accordance with an example embodiment.
Figure 6B:
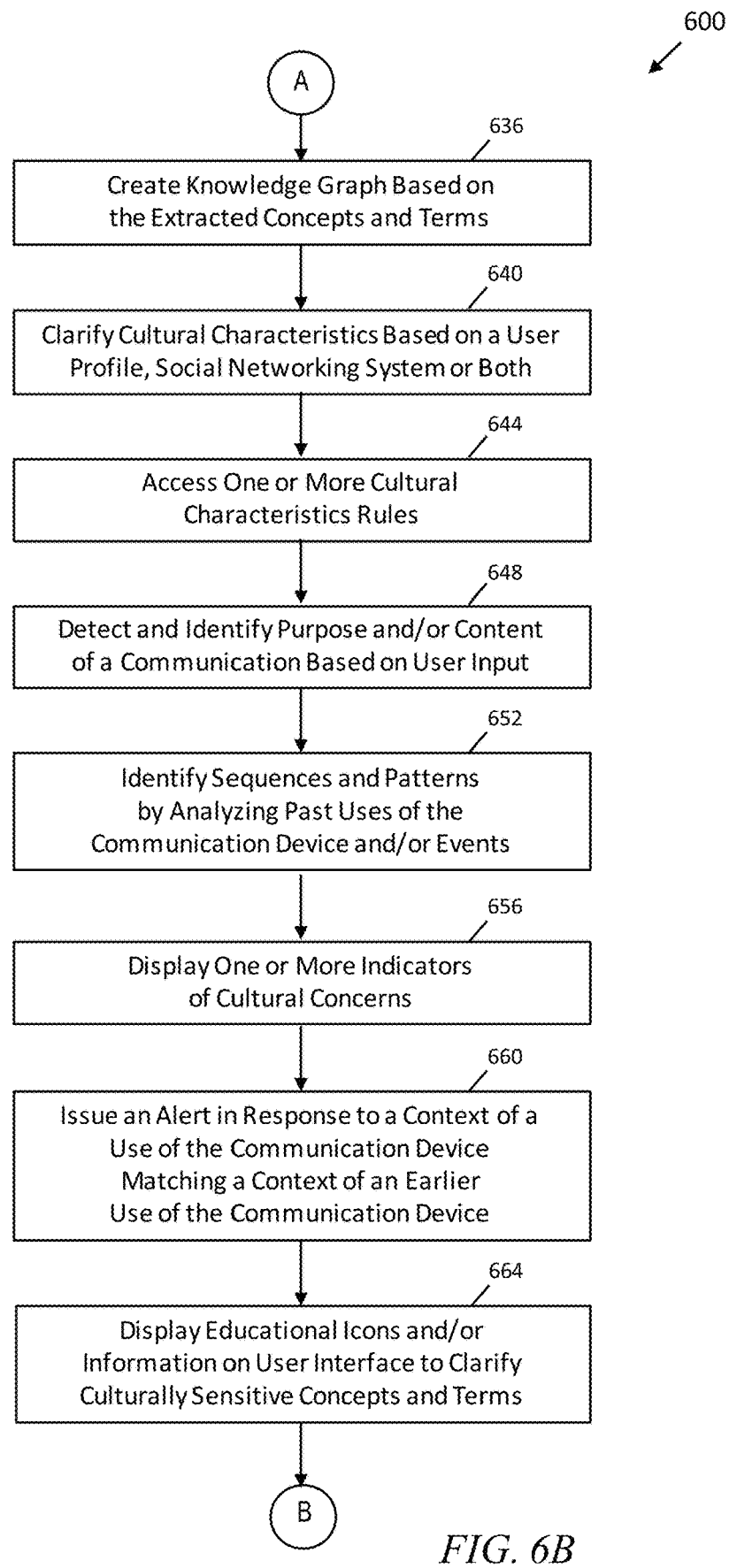
Figure 6C:
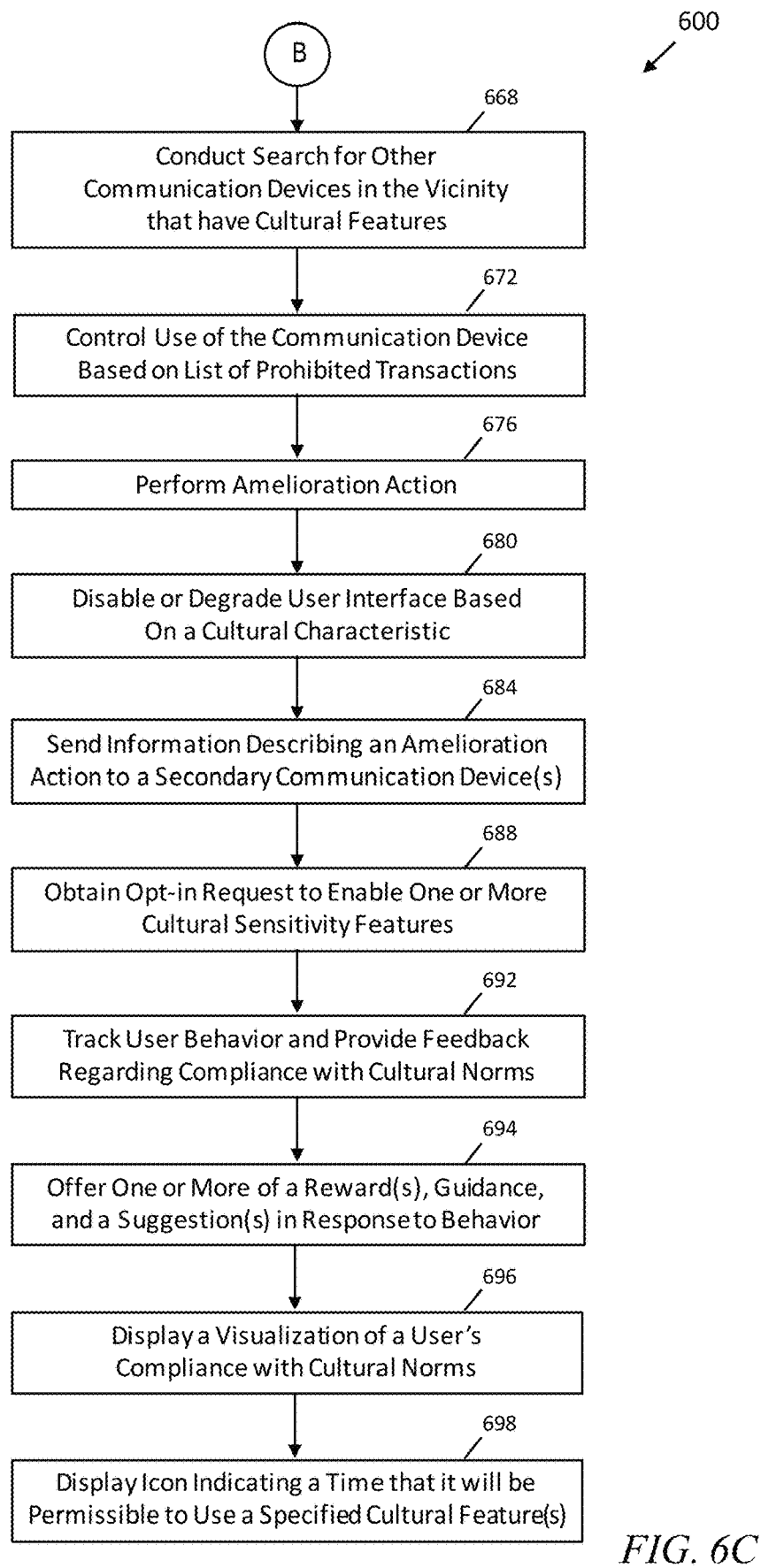

FIGS. 6A, 6B, and 6C present a flow chart of an example method 600 for operating a communication device in a culturally sensitive manner, in accordance with an example embodiment. In one example embodiment, the communication device is configured or reconfigured based on cultural norms and rules (operation 604). In one example embodiment, a check is performed to determine if a user has indicated an emergency situation (operation 608). If an emergency indication has not been received, the method 600 proceeds with operation 612 (discussed below). If an emergency indication has been received, one or more features of the communication device that are disabled in non-emergency situations due to cultural concerns are enabled while in the emergency mode (operation 610).

A selection of a culture, a belief or belief system, a cultural category, a school of thought, or any combination thereof is obtained (operation 612) and a selection of a degree of compliance of one or more cultural features of the communication device is obtained (operation 616), where the degree of compliance identifies one or more cultural norms to be observed. The degree of compliance can be implemented as probabilistic values or impact scores. For each cultural feature, the associated compliance absolute value or range of values can be computed. In one example embodiment, the probability value of the one or more cultural features occurring can range anywhere from just above zero percent to just below 100 percent, or can be represented as {Low, Medium, High}. These values are stored in the multidimensional confidence/risk database. In one example embodiment, the communication device is preconfigured based on user defined specifications and/or rules (operation 620). For example, a rule may establish that a display screen is to be disabled on a certain time or day of the week, such as during a holiday or other days where cultural observance is practiced and the use of phones may be considered insensitive. In one example embodiment, at least one of the rules is geotagged and/or dynamically changes based on learned context, historic uses of the communication device, a user profile, and the like.

One or more goals for a user regarding cultural behavior to adopt from other individuals, specific cultural behaviors to adopt, or both are obtained and instructions on actions to take to meet the one or more goals are issued to the user (operation 624). For example, the goals may be correlated with actions defined in a database that correlates actions and cultural norms.

One or more cultural characteristics related to use of a communication device are determined (operation 628). For example, cultural characteristics defined in a database corresponding to the selected culture, belief system, cultural belief, cultural category, school of thought and the like may be obtained.

Concepts and terms are extracted from cultural documentation (operation 632). For example, a custom natural language processing (NLP) module may be used to extract the concepts and terms from the cultural documentation. A knowledge graph is created based on the concepts and terms extracted from the cultural documentation and each cultural feature and associated context is geotagged and represented in the knowledge graph model (operation 636).

The cultural characteristics are clarified based on a user profile, a user's social networking system, or both (operation 640). In one example embodiment, the concept and terms are clarified based on the user profile using an analogy or metaphor translator.

One or more cultural characteristics rules are accessed (operation 644). The cultural characteristics relate to, for example, a time of day, a day of the week, a location of use of the communication device, a purpose of use of the communication device, message content, common courtesy, preservation of a family unit, rudeness, disruption concerns, a teaching of using will power to resist overuse of a communication device, a current location and travel path of a user during a call, and the like.

A purpose and/or content of a communication are detected and identified based on user input (operation 648). For example, the user may input one or more of pressing an emergency button on the communication device, typing in a code on the communication device, speaking an identifier into the communication device, and the like.

Sequences and patterns are identified by analyzing past uses of the communication device and/or events (operation 652). The sequences and patterns, coupled with contextual information, are used to determine or predict that a next use of the communication device is related to either non-cultural, norm-compliant or cultural, norm-compliant usage with a certain confidence level. In one example embodiment, the determining or predicting of the next use of the communication device uses one or more data sources, the one or more data sources being sensors of the communication device, data from mobile applications, data from nearby computing/communication devices, and the like. In one example embodiment, the determining or predicting of the next use of the communication device comprises analyzing user call records/logs and correlating the user call records/logs with a CC database.

One or more indicators of concerns that are of a cultural nature are displayed via a user interface (operation 656). For example, a list of culturally-insensitive ringtones may be played. An alert is issued to a user in response to a context of a current use of the communication device matching a context of an earlier use of the communication device that resulted in a violation of cultural norms (operation 660).

Educational icons and/or information are displayed on a user interface of the communication device to clarify culturally sensitive concepts and terms (operation 664). Information may also be displayed on the user interface of the communication device to describe why a feature of the communication device is discouraged.

A search is conducted for one or more other communication devices that are in a vicinity of the communication device, the one or more other communication devices having one or more cultural features (operation 668).

In one example embodiment, usage of the communication device is controlled with respect to phone calls, text messaging, Internet actions, Bluetooth, memory card usage, video options, camera options, and the like based on a "prohibited" (or discouraged) list of transactions (operation 672). The list may be maintained in a database with risk levels and other contextual factors such as the location, the transacting parties, the type of transaction, and the like.

An amelioration action is performed (operation 676). For example, an amelioration action may be performed based on usage of the communication device, the one or more cultural characteristics rules, and a confidence/risk level. In one example embodiment, the amelioration action is performed based on a detection of one or more other communication devices in a vicinity of the communication device, the one or more other communication devices having one or more cultural features. In one example embodiment, the amelioration action is performed in response to a detected culturally insensitive usage of the communication device, the amelioration action including one or more of alerting a family member of the user regarding the usage, controlling the communication device from a secondary communication device, or both. In one example embodiment, cultural features of the communication device are controlled using a secondary communication device.

In one example embodiment, the operation of a user interface of the communication device is disabled or degraded based on a cultural characteristic (operation 680). For example, the display capability of the communication device may be disabled.

In one example embodiment, information describing the amelioration action is sent to one or more secondary communication devices (operation 684). The amelioration action can be based on a multidimensional confidence/risk level.

An opt-in request to enable one or more cultural sensitivity features of the communication device is obtained (operation 688). For example, a user may allow other communication devices to learn that the user's communication device has cultural features.

Upon a user's consent, the user's behavior may be tracked and feedback is provided to inform the user regarding compliance with cultural norms (operation 692). For example, the use of prohibited ringtones in certain locations may be tracked and a chart illustrating the time(s) at which a ringtone violated cultural norms may be displayed. One or more of rewards, guidance, and suggestions are offered to the user via the communication device in response to good or useful behavior (operation 694). For example, a reward may be offered for cultural compliant usage of a phone in a specified location for a specified time period. The reward description may be accompanied by a list of the most common cultural violations at the specified location.

In one example embodiment, a visualization of a user's compliance with cultural norms is displayed (operation 696). For example, a dashboard may be displayed on the communication device. In one example embodiment, an icon is displayed indicating the time in the future at which it will be permissible to use specified features of the communication device (operation 698). This is based, for example, on a time of day, holiday for which certain behavior is appropriate/inappropriate within a certain culture, and the like; estimations of rudeness and disruptions to the family unit or other social or religious settings, concerns, or prohibitions; and the like.

Figure 7:
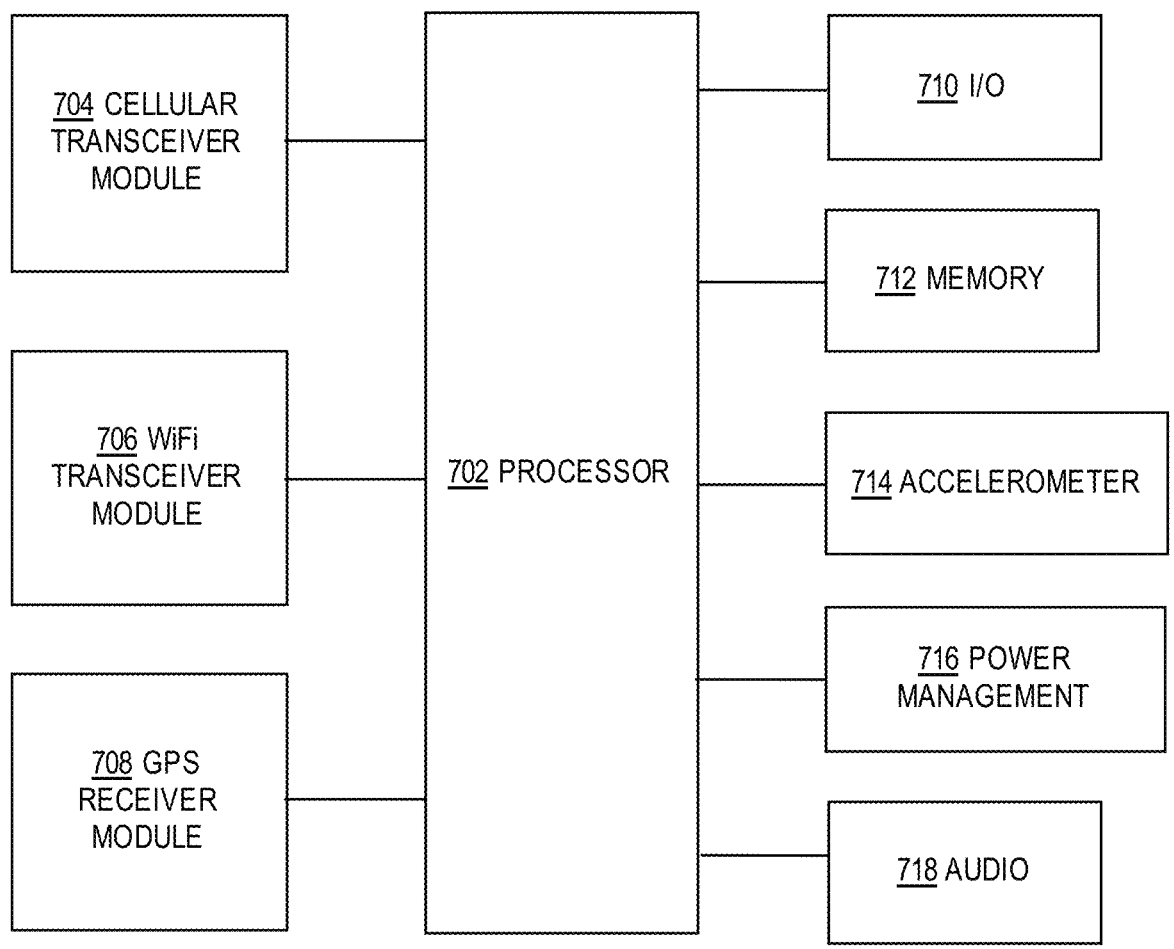
FIG. 7 is a block diagram of an exemplary smart phone implementing an embodiment of the invention, in accordance with an example embodiment.

FIG. 7 is a block diagram of an exemplary smart phone implementing an embodiment of the invention, in accordance with an example embodiment. The block diagram of FIG. 7 is also generally indicative of a tablet computing device or the like. The phone includes a suitable processor; e.g., a microprocessor 702. A cellular transceiver module 704 coupled to processor 702 includes an antenna and appropriate circuitry to send and receive cellular telephone signals. A Wi-Fi transceiver module 706 coupled to processor 702 includes an antenna and appropriate circuitry to allow phone 700 to connect to the Internet via a wireless network access point or hotspot. The skilled artisan will appreciate that "Wi-Fi" is a trademark of the Wi-Fi Alliance and the brand name for products using the IEEE 802.11 family of standards. A GPS receiver module 708 coupled to processor 702 includes an antenna and appropriate circuitry to allow phone 700 to calculate its position by precisely timing the signals sent by GPS satellites high above the Earth.

One or more implementations of the invention use software (such as software implementing the method 600) in memory 712 which when loaded into RAM causes the processor 702 to implement the logic described herein.

Input-output (I/O) block 710 coupled to processor 702 is indicative of a variety devices such as a touch screen, keypad, a display, and so on. Memory 712 is coupled to processor 702. Accelerometer 714 coupled to processor 702 detects acceleration of phone 700. Audio module 718 coupled to processor 702 includes, for example, an audio coder/decoder (codec), speaker, headphone jack, microphone, and so on. Optionally, a command system for responding to voice commands via automatic speech recognition can be provided. Power management system 716 can include a battery charger, an interface to a battery, and so on. Every implementation need not necessarily have every feature (e.g., accelerometer could be omitted in some embodiments).

Given the discussion thus far, it will be appreciated that, in general terms, an exemplary method, according to an aspect of the invention, includes the operations of: determining one or more cultural characteristics (CC) related to use of a communication device (operation 628); learning one or more cultural characteristics rules (operation 644); and triggering an amelioration action based on use of the communication device, the one or more cultural characteristics rules, and a confidence/risk level (operations 660, 664, 672, 676).

In one aspect, a non-transitory computer readable medium comprises computer executable instructions which when executed by a computer cause the computer to perform a method comprising operations of: determining one or more cultural characteristics (CC) related to use of a communication device (operation 628); learning one or more cultural characteristics rules (operation 644); and triggering an amelioration action based on use of the communication device, the one or more cultural characteristics rules, and a confidence/risk level (operations 660, 664, 672, 676).

In one aspect, an apparatus comprises a memory; and at least one processor, coupled to said memory, and operative to perform operations comprising: determining one or more cultural characteristics (CC) related to use of a communication device (operation 628); learning one or more cultural characteristics rules (operation 644); and triggering an amelioration action based on use of the communication device, the one or more cultural characteristics rules, and a confidence/risk level (operations 660, 664, 672, 676).

In one example embodiment, an opt-in request to enable one or more cultural sensitivity features of the communication device is obtained (operation 688). In one example embodiment, the amelioration action is one or more of providing an alert, providing a brief education to a user, rewarding a user for positive use of the communication device, enabling a cultural feature of the communication device, disabling a cultural feature of the communication device, and warning or discouraging a user regarding certain actions. In one example embodiment, the communication device is configured or reconfigured based on at least one of the one or more cultural characteristics rules (operation 620). In one example embodiment, a cultural feature is operated in a privacy mode and anonymized. In one example embodiment, educational icons and/or information are displayed on a user interface of the communication device to clarify culturally sensitive concepts and terms, information is displayed on a user interface of the communication device to describe why use of a feature of the communication device is discouraged, or both (operation 664).

In one example embodiment, one or more indicators of cultural sensitivity are displayed (operation 656). In one example embodiment, an icon indicating a time that it will be permissible to use specified features of the communication device is displayed (operation 698). In one example embodiment, one or more cultural features of the communication device are controlled using a secondary communication device (operation 676). In one example embodiment, sequences and patterns from past uses of the communication device and/or events are learned to determine or predict that a next use of the communication device is related to non-cultural, norm-compliant usage with a certain confidence level (operation 652). In one example embodiment, the determining or predicting of the next use of the communication device comprises analyzing user call records or logs and correlation with a cultural characteristics (CC) database (operation 652).

In one example embodiment, one or more other communication devices in a vicinity of the communication device are detected, where the amelioration action is performed based on the detection of the one or more other communication devices in the vicinity of the communication device, the one or more other communication devices having one or more cultural features (operation 668). In one example embodiment, a user is alerted in response to a context of a current use of the communication device matching a context of an earlier use of the communication device that resulted in a violation of cultural norms (operation 660). In one example embodiment, a selection of a degree of compliance of one or more cultural features of the communication device is obtained, where the degree of compliance identifies one or more cultural norms to be observed (operation 616). In one example embodiment, the amelioration action is sent to one or more secondary communication devices based on a multidimensional confidence/risk level (operation 684). In one example embodiment, the amelioration action is degrading operation of a user interface of the communication device (operation 680). In one example embodiment, in emergency situations, one or more features of the communication device that are disabled or degraded in non-emergency situations due to cultural concerns are enabled (operation 610). In one example embodiment, a behavior of a user is tracked and feedback is provided to inform the user regarding compliance with cultural norms (operation 692).

Figure 8:
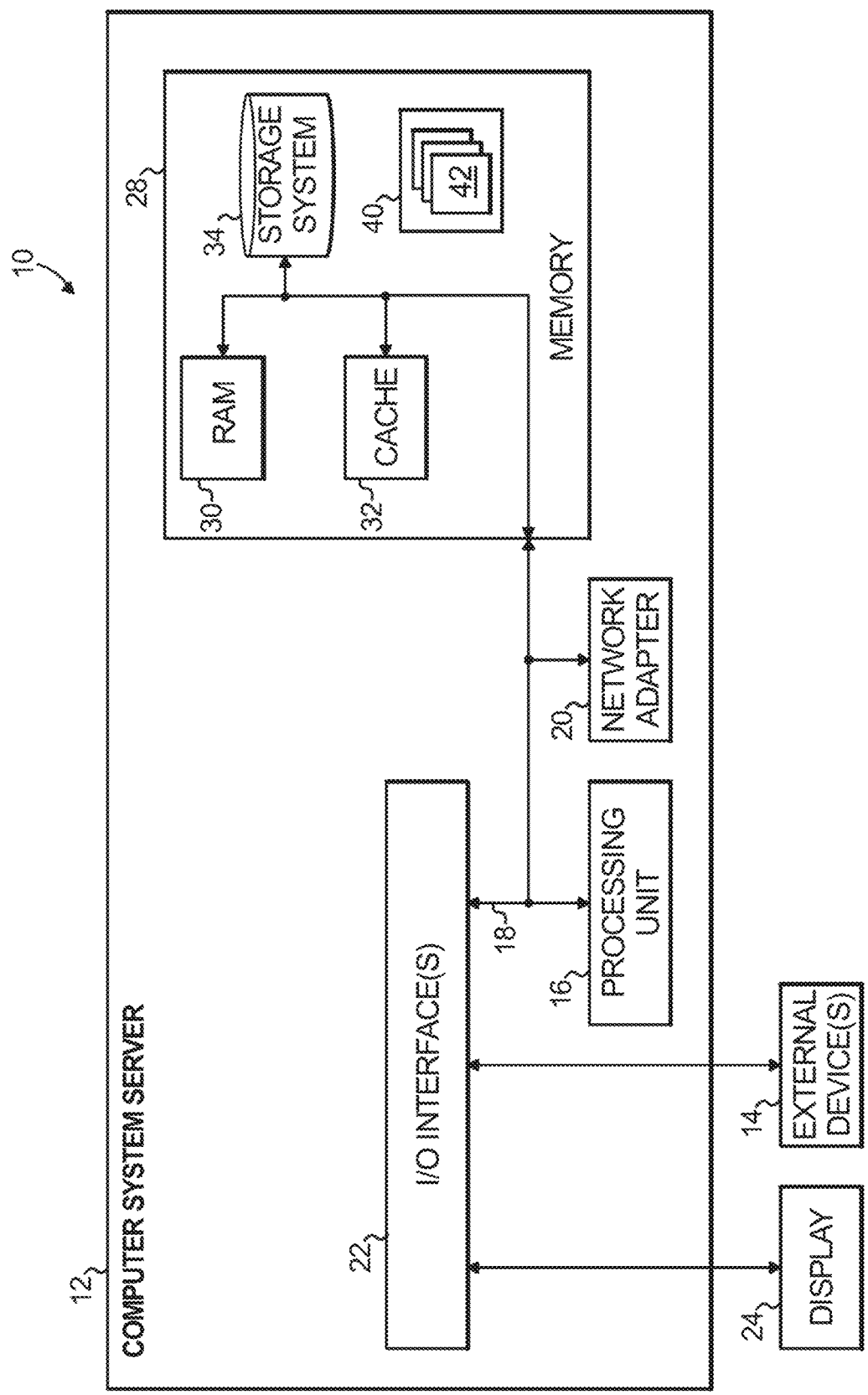
FIG. 8 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 8 depicts a computer system that may be useful in implementing one or more aspects and/or elements of the invention, also representative of a cloud computing node according to an embodiment of the present invention. Referring now to FIG. 8, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 8, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 8) running a server program. It will be understood that such a physical server may or may not include a display and keyboard.

One or more embodiments can be at least partially implemented in the context of a cloud or virtual machine environment, although this is exemplary and non-limiting. Reference is made back to FIGS. 1-2 and accompanying text. For example, aspects of the method 600 could be implemented in the cloud environment 50 with communication of results to the smart phone or other communication device that it is desired to operate in a culturally sensitive manner.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules. Note that modules 42 could also be present in memory 712 of the "smart" phone for example.

One example of user interface that could be employed in some cases is hypertext markup language (HTML) code served out by a server or the like, to a browser of a computing device of a user. The HTML is parsed by the browser on the user's computing device to create a graphical user interface (GUI).

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    with at least one processor, determining one or more cultural characteristics (CC) related to use of a communication device;
    with the at least one processor, learning one or more cultural characteristics rules for configuring and operating the communication device;
    with the at least one processor, tracking a behavior of a user operating the communication device;
    with the at least one processor, learning sequences and patterns from past uses of the communication device to predict with a certain confidence level that a next use of the communication device is related to non-compliant usage in terms of culture; and
    with the at least one processor, triggering an amelioration action based on use of the communication device, the one or more cultural characteristics rules, the tracked behavior, and the confidence level, the amelioration action comprising configuring the communication device based on the one or more cultural characteristics rules and the tracked behavior.

2. The method of claim 1, further comprising obtaining an opt-in request to enable one or more cultural sensitivity features of the communication device.

3. The method of claim 1, wherein the amelioration action is one or more of providing an alert, providing a brief education to a user, rewarding a user for positive use of the communication device, enabling a cultural feature of the communication device, disabling a cultural feature of the communication device, and warning or discouraging a user regarding certain actions.

4. The method of claim 1, further comprising reconfiguring the communication device based on at least one of the one or more cultural characteristics rules.

5. The method of claim 1, wherein a cultural feature is operated in a privacy mode and anonymized.

6. The method of claim 1, further comprising displaying educational icons and/or information on a user interface of the communication device to clarify culturally sensitive concepts and terms, displaying information on a user interface of the communication device to describe why use of a feature of the communication device is discouraged, or both.

7. The method of claim 1, further comprising displaying one or more indicators of cultural sensitivity.

8. The method of claim 1, further comprising displaying an icon indicating a time that it will be permissible to use specified features of the communication device.

9. The method of claim 1, further comprising controlling one or more cultural features of the communication device using a secondary client-based communication device.

10. The method of claim 1, further comprising learning sequences and patterns from past events to determine or predict that the next use of the communication device is related to non-compliant usage in terms of the culture.

11. The method of claim 10, wherein the determining or predicting of the next use of the communication device comprises analyzing user call records or logs and correlation with a cultural characteristics (CC) database.

12. The method of claim 1, further comprising detecting one or more other communication devices in a vicinity of the communication device, where the amelioration action is performed based on the detection of the one or more other communication devices in the vicinity of the communication device, the one or more other communication devices having one or more cultural features.

13. The method of claim 1, further comprising alerting a user in response to a context of a current use of the communication device matching a context of an earlier use of the communication device that resulted in a violation of one or more cultural norms.

14. The method of claim 1, further comprising obtaining a selection of a degree of compliance of one or more cultural features of the communication device, where the degree of compliance identifies one or more cultural norms to be observed.

15. The method of claim 1, further comprising sending the amelioration action to one or more secondary communication devices based on a multidimensional confidence/risk level.

16. The method of claim 1, wherein the amelioration action is degrading operation of a user interface of the communication device.

17. The method of claim 1, further comprising enabling, in emergency situations, one or more features of the communication device that are disabled or degraded in non-emergency situations due to cultural concerns.

18. The method of claim 1, further comprising providing feedback to inform the user regarding compliance with cultural norms.

19. A non-transitory computer readable medium comprising computer executable instructions which when executed by a computer cause the computer to perform a method comprising operations of:
    determining one or more cultural characteristics (CC) related to use of a communication device;
    learning one or more cultural characteristics rules for configuring and operating the communication device;

tracking a behavior of a user operating the communication device;

learning sequences and patterns from past uses of the communication device to predict with a certain confidence level that a next use of the communication device is related to non-compliant usage in terms of culture; and triggering an amelioration action based on use of the communication device, the one or more cultural characteristics rules, the tracked behavior, and the confidence level, the amelioration action comprising configuring the communication device based on the one or more cultural characteristics rules and the tracked behavior.

20. An apparatus comprising:

a memory; and at least one processor, coupled to said memory, and operative to perform operations comprising:

determining one or more cultural characteristics (CC) related to use of a communication device;

learning one or more cultural characteristics rules for configuring and operating the communication device;

tracking a behavior of a user operating the communication device;

learning sequences and patterns from past uses of the communication device to predict with a certain confidence level that a next use of the communication device is related to non-compliant usage in terms of culture; and triggering an amelioration action based on use of the communication device, the one or more cultural characteristics rules, the tracked behavior, and the confidence level, the amelioration action comprising configuring the communication device based on the one or more cultural characteristics rules and the tracked behavior.

* * * * *